United States Patent Office 3,462,427
Patented Aug. 19, 1969

3,462,427
NOVEL 1-(CYCLOALKYLIDENE-ETHYL-4-PHENYL-PIPERIDINES
Herbert Merz, Hans-Detlef Schroeder, Adolf Langbein, and Karl Zeile, Ingelheim am Rhein, Germany, assignors to Boehringer Ingelheim G.m.b.H., Ingelheim am Rhein, Germany, a corporation of Germany
No Drawing. Filed June 8, 1966, Ser. No. 555,957
Claims priority, application Germany, June 16, 1965, B 82,430
Int. Cl. C07d 31/32; A61k 27/00
U.S. Cl. 260—240                              9 Claims

ABSTRACT OF THE DISCLOSURE

The compounds are 1 - (cycloalkylidene-ethyl) - 4 - (hydroxy- or methoxy-phenyl)-4-(lower alkanoyl or lower alkanoyl or lower alkoxycarbonyl)-piperidines and nontoxic acid addition salts thereof, useful as morphine-antagonists and analgesics in warm-blooded animals.

---

This invention relates to novel 1 - (cycloalkylidene-ethyl)-4-phenyl-piperidines and acid addition salts thereof, as well as to a method of preparing these compounds.

More particularly, the present invention relates to novel derivatives of piperidine of the formula

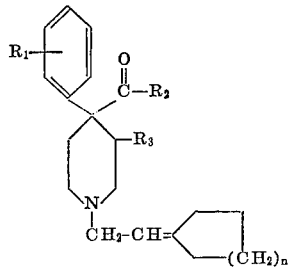

(I)

wherein $R_1$ is m- or p-hydroxy or m- or p-methoxy,
$R_2$ is methyl, ethyl, propyl, methoxy, ethoxy or propoxy,
$R_3$ is hydrogen or methyl, and
$n$ is an integer from 1 to 4, inclusive, and nontoxic, pharmacologically aceptable acid addition salts thereof.

The compounds according to the present invention may be prepared by reacting a secondary piperidine compound of the formula

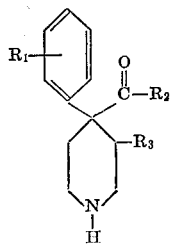

(II)

wherein $R_1$, $R_2$ and $R_3$ have the same meanings as in Formula I, or an acid addition salt thereof, with a cycloalkylidene-ethyl compound of the formula

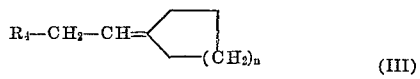

(III)

wherein $R_4$ is halogen or O-p-toluenesulfonyl, and
$n$ has the same meanings as in Formula I.

The reaction is preferably carried out in the presence of a suitable inert organic solvent and of an acid-binding agent at a temperature between 20 and 150° C. By "acid-binding agent" we mean a compound capable of tying up or neutralizing the acid formed by the reaction, such as sodium bicarbonate or sodium carbonate. The reactants may be provided in a molar ratio of 1:1, but it is preferred to provide an excess of the cycloalkylidene-ethyl Compound III. Preferred inert organic solvents are lower alkanols or a mixture of dimethylformamide and tetrahydrofuran.

The starting compounds of the Formula II above may be obtained by well known methods, such as by subjecting a benzyl cyanide of the formula

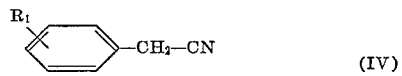

(IV)

wherein $R_1$ has the same meanings as in Formula I, to a ring closure reaction with an amide of the formula

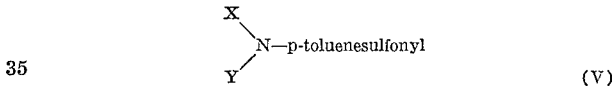

(V)

wherein X and Y each represent a β-haloalkyl group, according to Eisleb, Chem. Bev. 74 (1941), 1433.

In those cases where $R_1$ in Formula I is to be hydroxy, the ring closure reaction for the preparation of the corresponding starting Compound II must be effected with the corresponding methoxybenzyl cyanide, followed by ether cleavage (see German Patent 679,281 and Swiss Patent 236,312). In those cases where $R_3$ in Formula II is methyl, the distribution of cis- and trans-isomers is controlled in customary fashion (see, for example U.S. Patent 3,004,977).

The selective or simultaneous removal of the p-toluenesulfonyl group and hydrolysis of the cyano group in the reaction product of Compounds IV and V to obtain a compound of the Formula II is adequately described in the prior art (see Eisleb, loc. cit. and U.S. Patent 3,004,977). In those cases where $R_1$ in Compound IV is methoxy, the removal of the p-toluenesulfonyl group, the hydrolysis of the cyano group and the cleavage of the methoxy group may be effected simultaneously with hydrogen bromide in a single reaction step.

Gringnard reactions of 4 - phenyl - 4 - cyano-piperidines have been repeatedly described in the prior art (see, for example, German Patent 679,281). In analogous fashion, the starting compounds of the Formula II may also be obtained by subjecting a 1 - p - toluenesulfonyl - 4 - phenyl-4-cyano-piperidine of the formula

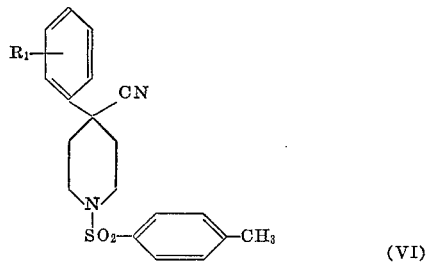

(VI)

wherein $R_1$ has the same meanings as in Formula I, with a Grignard reagent to form the corresponding 4-ketimine, and thereafter removing the p-toluenesulfonyl group in the 1-position and hydrolyzing the ketimine group to the ketone group by the methods described in the prior art cited above.

Using either of the methods described above, the following secondary piperidine starting compounds of the Formula II were prepared:

(I) 4-(3'-hydroxy-phenyl)-4-acetyl-piperidine, M.P. 205° C.
(II) 4-(3'-hydroxy-phenyl)-4-propionyl-piperidine, M.P. 223° C.
(III) 4-(3'-hydroxy-phenyl)-4-butyryl-piperidine hydrochloride, M.P. 216° C.
(IV) 4-(3'-hydroxy-phenyl)-4-carbomethoxy-piperidine hydrochloride, M.P. 244° C.
(V) 4-(3'-hydroxy-phenyl)-4-carbethoxy-piperidine hydrochloride, M.P. 192° C.
(VI) 4 - (3'-hydroxy-phenyl)-4-carbopropoxy-piperidine hydrochloride, M.P. 158° C.
(VII) 4-(3'-methoxy-phenyl)-4-propionyl-piperidine hydrochloride, M.P. 202° C.
(VIII) 4 - (3' - methoxy-phenyl)-4-carbethoxy-piperidine hydrochloride, M.P. 163° C.
(IX) 4-(4'-hydroxy-phenyl)-4-propionyl-piperidine, M.P. 166° C.
(X) 4-(4'-hydroxy-phenyl)-4-carbethoxy-piperidine hydrochloride, M.P. 199° C.
(X) 4-(4'-hydroxy-phenyl)-4-carbethoxy - piperidine hyperidine, M.P. 209° C.
(XII) α - 3 - methyl-4-(3'-hydroxy-phenyl)-4-carbomethoxy-piperidine hydrochloride, M.P. 218° C.
(XIII) β - 3-methyl-4-(3'-hydroxy-phenyl)-4-carbomethoxy-piperidine hydrochloride, M.P. 212° C.
(XIV) α - 3-methyl-4-(3'-hydroxy-phenyl)-4-carbethoxy-piperidine, M.P. 175–178° C.
(XV) β - 3 - methyl-4-(3'-hydroxy-phenyl)-4-carbethoxy-piperidine, M.P. 146–419° C.

The following examples further illustrate the present invention and will enable others skilled in the art to understand it more completely. It should be understood, however, that the instant invention is not limited to the particular examples given below.

EXAMPLE 1

Preparation of 1-(β-cyclohexylidene-ethyl)-4-(3'-hydroxyphenyl)-4-carbethoxy-piperidine hydrochloride A mixture of 2.86 g. (0.01 mol) of 4-(3'-hydroxyphenyl)-4-carbethoxy-piperidine hydrochloride, 2.10 g. (0.025 mol) of sodium bicarbonate, 2.1 g. (0.011 mol) of cyclohexylidene ethyl bromide, 10 cc. of dimethylformamide and 15 cc. of tetrahydrofuran was refluxed for six hours. Thereafter, the solvent mixture was evaporated in vacuo in a rotary vaporizer, and the residue was shaken with a mixture of chloroform and water. The aqueous phase was separated, again shaken with chloroform, and the chloroform phases were combined, washed with water and dried with sodium sulfate. Subsequently, the chloroform solvent was evaporated, leaving as a residue the raw base 1-(β-cyclohexylidene-ethyl)-4-(3'-hydroxy-phenyl)-4-carbethoxy-piperidine of the formula

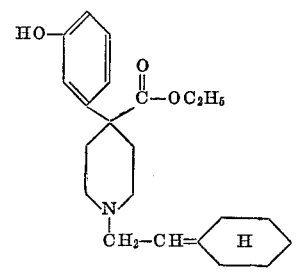

The raw base was purified by filtration through aluminum oxide (neutral aluminum oxide of activity level II). For this purpose the raw base was dissolved in 20 cc. of chloroform, and the resulting solution was filtered through a chromatographic column packed with 75 g. of aluminum oxide, followed by washing with chloroform. The filtrate contained the pure base.

The filtrate was evaporated, the residue was dissolved in 20 cc. of ethanol, the solution was acidified with 4 cc. of ethanolic hydrochloric acid, and the acid solution was admixed with ether until it became cloudy. A crystalline precipitate formed. The mixture was cooled in a refrigerator, the precipitate was separated by vacuum filtration, and the filter cake was washed with ether. 2.8 g. (71% of theory) of the hydrochloride salt, M.P. 212° C., were obtained. After recrystallization from a mixture of ethanol and ether, analytically pure 1-(β-cyclohexylidene-ethyl)-4 - (3' - hydroxy-phenyl)-4-carbethoxy-piperidine hydrochloride, M.P. 215° C., was obtained.

EXAMPLE 2

Preparation of 1-(β-cyclohexylidene-ethyl)-4-(3'-hydroxyphenyl)-4-propionyl-piperidine hydrochloride A mixture of 2.33 g. (0.01 mol) of 4-(3'-hydroxyphenyl)-4-propionyl-piperidine, 1.26 g. (0.015 mol) of sodium bicarbonate, 2.1 g. (0.011 mol) of cyclohexylidene ethyl bromide, 10 cc. of dimethylformamide and 25 cc. of tetrahydrofuran was refluxed for six hours. Thereafter, the reaction mixture was worked up as described in Example 1, yielding raw 1-(β-cyclohexylidene-ethyl)-4-(3'-hydroxyphenyl)-4-propionyl-piperidine of the formula

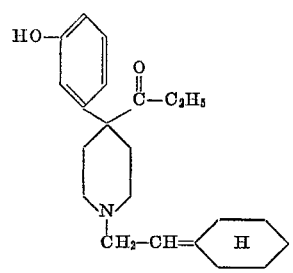

The raw base was purified and converted into its hydrochloride salt as described in Example 1, yielding 2.65 g. (70% of theory) of analytically pure 1-(β-cyclohexylidene-ethyl) - 4 - (3' - hydroxy - phenyl) - 4 - propionyl-piperidine hydrochloride, M.P. 203° C.

EXAMPLE 3

Using a procedure analogous to that described in Example 2, 1 - (β - cyclopentylidene-ethyl) - 4 - (3'-hydroxyphenyl)-4-propionyl-piperidine of the formula

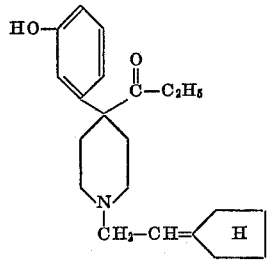

was prepared from 4-(3'-hydroxy-phenyl)-4-propionyl-piperidine and cyclopentylidene ethyl bromide.

Its hydrochloride had a melting point of 216° C. The yield was 60.5% of theory.

EXAMPLE 4

Using a procedure analogous to that described in Example 1, 1 - (β - cyclopentylidene-ethyl) - 4-(3'-hydroxyphenyl)-4-carbomethoxy-piperidine of the formula

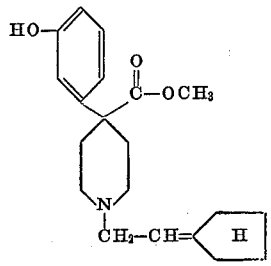

was prepared from 4 - (3' - hydroxy-phenyl) - 4 - carbomethoxy-piperidine and cyclopentylidene ethyl bromide.

Its hydrochloride had a melting point of 208° C. The yield was 72.5% of theory.

EXAMPLE 5

Using a procedure analogous to that described in Example 1, 1 - (β - cyclopentylidene - ethyl)-4-(3'-hydroxyphenyl)-4-carbethoxy-piperidine of the formula

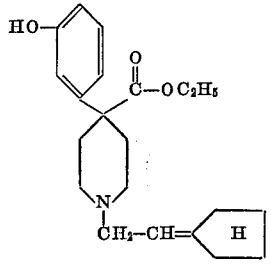

was prepared from 4 - (3' - hydroxy-phenyl)-carbethoxypiperidine and cyclopentylidene ethyl bromide.

Its hydrochloride had a melting point of 221° C. The yield was 61.0% of theory.

EXAMPLE 6

Using a procedure analogous to that described in Example 1, 1 - (β - cyclopentylidene-ethyl)-4-(3'-hydroxyphenyl)-4-carbopropoxy-piperidine of the formula

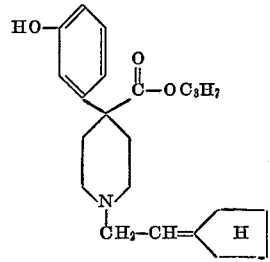

was prepared from 4 - (3' - hydroxy-phenyl)-4-carbopropoxy-piperidine and cyclopentylidene ethyl bromide.

Its hydrochloride had a melting point of 214° C. The yield was 58.0% of theory.

EXAMPLE 7

Using a procedure analogous to that described in Example 2, 1 - (β - cyclohexylidene-ethyl)-4-(3'-hydroxyphenyl)-4-acetyl-piperidine of the formula

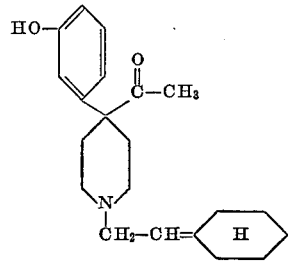

was prepared from 4-(3'-hydroxy-phenyl)-4-acetyl-piperidine and cyclohexylidene ethyl bromide.

Its hydrochloride had a melting point of 208° C. The yield was 62.0% of theory.

EXAMPLE 8

Using a procedure analogous to that described in Example 1, 1 - (β - cyclohexylidene-ethyl)-4-(3'-hydroxyphenyl)-4-butyryl-piperidine of the formula

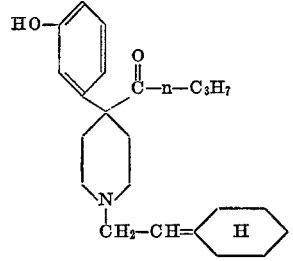

was prepared from 4-(3'-hydroxy-phenyl)-4-butyryl-piperidine and cyclohexylidene ethyl bromide.

Its hydrochloride had a melting point of 209° C. The yield was 69.0% of theory.

EXAMPLE 9

Using a procedure analogous to that described in Example 1, 1 - (β - cyclohexylidene-ethyl)-4-(3'-hydroxyphenyl)-4-carbomethoxy-piperidine of the formula

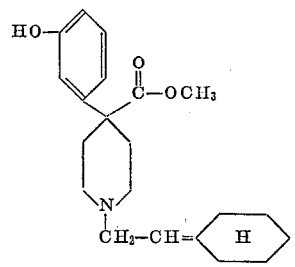

was prepared from 4 - (3' - hydroxy - phenyl)-4-carbomethoxy-piperidine and cyclohexylidene ethyl bromide.

Its hydrochloride had a melting point of 194° C. The yield was 72.5% of theory.

Its methanesulfonate had a melting point of 187.5–189° C.

EXAMPLE 10

Using a procedure analogous to that described in Example 1, 1-(β-cyclohexylidene-ethyl)-4-(3'-hydroxy-phenyl)-4-carbopropoxy-piperidine of the formula

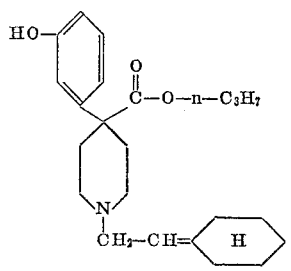

was prepared from 4 - (3'-hydroxy-phenyl)-4-carbopropoxy-piperidine and cyclohexylidene ethyl bromide.

Its hydrochloride had a melting point of 207° C. The yield was 66.0% of theory.

EXAMPLE 11

Using a procedure analogous to that described in Example 2, α - 1-(β-cyclohexylidene-ethyl)-3-methyl-4-(3'-hydroxy-phenyl)-4-propionylpiperidine of the formula

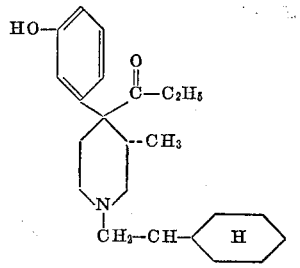

was prepared from α-3-methyl-4-(3'-hydroxy-phenyl)-4-propionyl-piperidine and cyclohexylidene ethyl bromide.

Its hydrochloride had a melting point of 115° C. The yield was 60.0% of theory.

EXAMPLE 12

Using a procedure analogous to that described in Example 1, α - 1-(β-cyclohexylidene-ethyl)-3-methyl-4-(3'-hydroxy-phenyl)-4-carbomethoxypiperidine of the formula

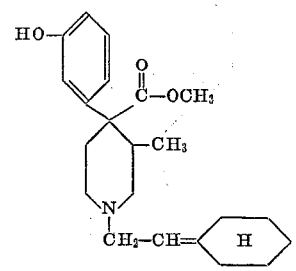

was prepared α-3-methyl-4-(3'-hydroxy-phenyl)-4-carbomethoxy-piperidine and cyclohexylidene ethyl bromide.

Its hydrochloride had a melting point of 125° C. The yield was 42% of theory.

EXAMPLE 13

Using a procedure analogous to that described in Example 1, β - 1-(β-cyclohexylidene-ethyl)-3-methyl-4-(3'-hydroxy-phenyl)-4-carbomethoxypiperidine of the formula

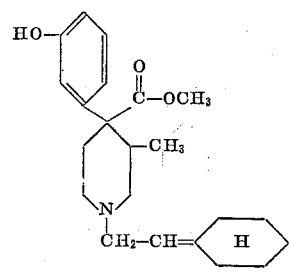

was prepared from β-3-methyl-4-(3'-hydroxy-phenyl)-4-carbo-methoxy-piperidine and cyclohexylidene ethyl bromide.

Its hydrochloride had a melting point of 192° C. The yield was 78% of theory.

EXAMPLE 14

Using a procedure analogous to that described in Example 2, 1-(β-cyclohexylidene-ethyl)-4-(3'-methoxy-phenyl)-4-propionyl-piperidine of the formula

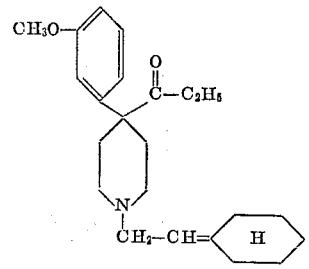

was prepared from 4-(3'-methoxy-phenyl)-4-propionyl-piperidine and cyclohexylidene ethyl bromide.

Its hydrochloride had a melting point of 112° C. The yield was 38% of theory.

EXAMPLE 15

Using a procedure analogous to that described in Example 1, 1-(β-cyclohexylidene-ethyl)-4-(4'-hydroxy-phenyl)-4-carbethoxy-piperidine of the formula

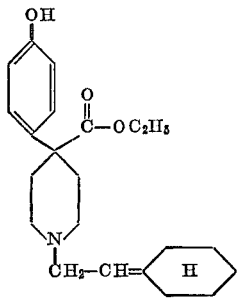

was prepared from 4-(4'-hydroxy-phenyl)-4-carbethoxy-piperidine and cyclohexylidine ethyl bromide.

Its hydrochloride had a melting point of 177° C. The yield was 40% of theory.

EXAMPLE 16

Using a procedure analogous to that described in Example 1, 1-(β-cyclohexylidene-ethyl)-4-(3'-methoxy-phenyl)-4-carbethoxy-piperidine of the formula

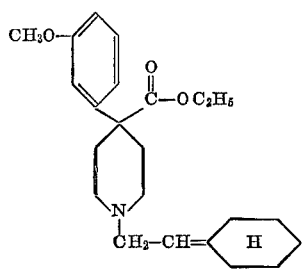

was prepared from 4-(3'-methoxy-phenyl)-4-carbethoxy-piperidine and cyclohexylidene ethyl bromide.

Its hydrochloride had a melting point of 155° C. The yield was 35.5% of theory.

EXAMPLE 17

Using a procedure analogous to that described in Example 2, 1-(β-cycloheptylidene-ethyl)-4-(3'-hydroxy-phenyl)-4-propionyl-piperidine of the formula

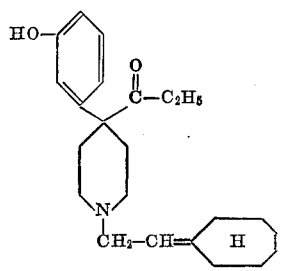

was prepared from 4-(3'-hydroxy-phenyl)-4-propionyl-piperidine and cycloheptylidene ethyl bromide.

Its hydrochloride had a melting point of 179° C. The yield was 55% of theory.

EXAMPLE 18

Using a procedure analogous to that described in Example 1, 1-(β-cycloheptylidene-ethyl)-4-(3'-hydroxy-phenyl)-4-carbomethoxy-piperidine of the formula

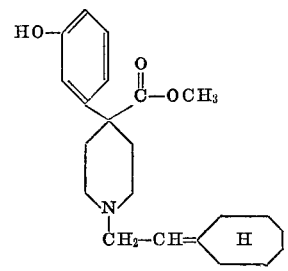

was prepared from 4-(3'-hydroxy-phenyl)-4-carbomethoxy-piperidine and cycloheptylidene ethyl bromide.

Its hydrochloride had a melting point of 174° C. The yield was 51% of theory.

EXAMPLE 19

Using a procedure analogous to that described in Example 1, 1-(β-cycloheptylidene-ethyl)-4-(3'-hydroxy-phenyl)-4-carbethoxy-piperidine of the formula

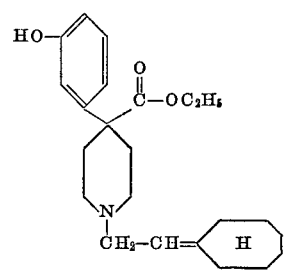

was prepared from 4-(3'-hydroxy-phenyl)4-carbethoxy-piperidine and cycloheptylidene ethyl bromide.

Its hydrochloride had a melting point of 193° C. The yield was 58% of theory.

EXAMPLE 20

Using a procedure analogous to that described in Example 2, 1-(β-cyclooctylidene-ethyl)-4-(3'-hydroxy-phenyl)-4-propionyl-piperidine of the formula

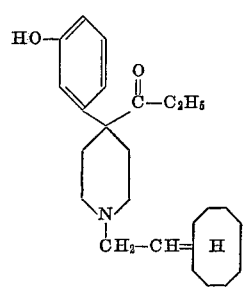

was prepared from 4-(3'-hydroxy-phenyl)-4-propionyl-piperidine and cyclooctylidene ethyl bromide.

Its hydrochloride had a melting point of 175° C. The yield was 50° of theory.

11

EXAMPLE 21

Using a procedure analogous to that described in Example 1, 1-(β-cyclooctylidene - ethyl) - 4 - (3' - hydroxyphenyl)-4-carbomethoxy-piperidine of the formula

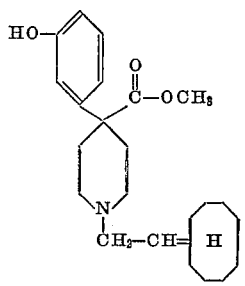

was prepared from 4-(3'-hydroxy-phenyl)-4-carbomethoxy-piperidine and cyclooctylidene ethyl bromide.

Its hydrochloride had a melting point of 204° C. The yield was 63% of theory.

The novel compounds according to the present invention, that is, those embraced by Formula I above, their stereoisomers, and the nontoxic, pharmacologically acceptable acid addition salts of said compounds or their stereoisomers, have useful pharmacodynamic properties. More particularly, they exhibit effective morphine-antagonistic activities and analgesic activites in warm-blooded animals.

For pharmaceutical purposes the compounds according to the present invention are administered perorally, parenterally or rectally to warm-blooded animals as active ingredients in conventional dosage unit compositions; that is, compositions in dosage unit form consisting essentially of an inert pharmaceutical carrier and one dosage unit of the active ingredient, such as tablets, coated pills, emulsions, solutions, suppositories, capsules, wafers and the like. One dosage unit of the compounds pursuant to the invention is from 10 to 300 mg., preferably 50 to 150 mg. The dosage unit compositions containing the compounds of the invention as active ingredients may also comprise an effective analgesic amount of an addiction-producing narcotic, such as morphine, meperidine or ketobemidone.

The following examples illustrate a few dosage unit compositions comprising a compound according to the present invention as an active ingredient. The parts are parts by weight, unless otherwise specified.

EXAMPLE 22

Hypodermic solution

The solution is compounded from the following ingredients:

|  | Parts |
|---|---|
| 1-(β-cyclohexylidene - ethyl) - 4 - (3' - hydroxyphenyl)-4-carbomethoxy - piperidine methane sulfonate | 100.0 |
| Dextrose | 10.0 |
| Distilled water, q.s. ad _____by vol__ | 2000.0 |

Compounding procedure.—The dextrose and the piperidine compound are dissolved in the distilled water, and the solution is filtered until free from suspended matter. Thereafter, the solution is filled into 2 cc.-ampulses, which are subsequently sterilized and sealed. Each ampule contains 100 mg. of the active ingredient.

12

EXAMPLE 23

Tablets

The tablet composition is compounded from the following ingredients:

|  | Parts |
|---|---|
| 1-(β-cyclohexylidene-ethyl) - 4 - (3'-hydroxyphenyl)-4-carbomethoxy-piperidine hydrochloride | 50.0 |
| Corn starch | 30.0 |
| Lactose | 20.0 |
| Colloidal silicic acid | 2.0 |
| Gelatin | 3.0 |
| Magnesium stearate | 2.0 |
| Talcum | 3.0 |
| Total | 110.0 |

Compounding procedure.—The piperidine compound, the corn starch, the lactose and the silicic acid are thoroughly admixed with each other, the mixture is granulated with the aid of an aqueous solution of the gelatin, the granulate is admixed with the magnesium stearate and the talcum, and the finished mixture is pressed into 110 mg.-tables. Each tablet contains 50 mg. of the active ingredient.

EXAMPLE 24

Drop solution

The solution is compounded from the following ingredients:

|  | Parts |
|---|---|
| 1-(β-cyclohexylidene-ethyl) - 4 - (3' - hydroxyphenyl) - 4-carbomethoxy-piperidine methanesulfonate | 10.0 |
| p-Hydroxy-benzoic acid methyl ester | 0.07 |
| p-Hydroxy-benzoic acid propyl ester | 0.03 |
| Ethanol | 20.0 |
| Polyethyleneglycol 400 | 20.0 |
| Distilled water, q.s.ad _____by vol__ | 100.0 |

Compounding procedure.—The individual ingredients are successively dissolved in a sufficient amount of distilled water, and the solution is diluted with distilled water to the desired volume. 1 cc. of the solution (about 5 drops) contains 100 mg. of the active ingredient.

EXAMPLE 25

Suppositories

The suppository composition is compounded from the following ingredients:

|  | Parts |
|---|---|
| 1-(β-cyclohexylidene-ethyl) - 4 - (3' - hydroxyphenyl) - 4 - carbomethoxy-piperidine hydrochloride | 150.0 |
| Lactose | 150.0 |
| Cocoa butter | 1400.0 |
| Total | 1700.0 |

Compounding procedure.—The cocoa butter is melted, cooled to about 38° C., and the piperidine compound and the lactose are stirred in until the mass is homogeneous. The composition is then poured into cooled suppository molds, each holding 1700 mg. of the composition. Each suppository contains 150 mg. of the active ingredient.

Although the above dosage unit composition examples illustrate only one compound according to the invention as an active ingredient, it should be understood that any of the other compounds embraced by Formula I or their nontoxic, pharmacologically acceptable acid addition salts may be substituted for the particular active ingredient illustrated in Examples 22 to 25. Moreover, the amount of active ingredient may be varied within the dosage unit limits set forth above, and the amount and nature of the inert carrier components may be varied to meet particular requirements.

We claim:
1. A compound of the formula

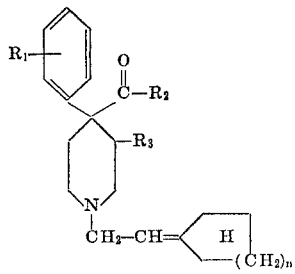

wherein $R_1$ is m- or p-hydroxy or m- or p-methoxy,
$R_2$ is methyl, ethyl, propyl, methoxy, ethoxy or propoxy,
$R_3$ is hydrogen or methyl, and
$n$ is an integer from 1 to 4, inclusive, or a nontoxic, pharmacologically acceptable acid addition salt thereof.

2. A compound of the formula

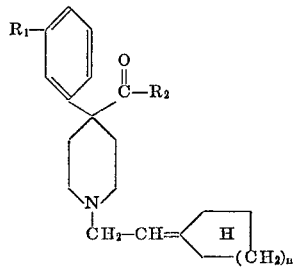

wherein $R_1$ is hydroxy or methoxy,
$R_2$ is alkyl of 1 to 3 carbon atoms or alkoxy of 1 to 3 carbon atoms,
$R_3$ is hydrogen, α-methyl or β-methyl, and
$n$ is an integer from 1 to 4, inclusive, or a nontoxic, pharmacologically acceptable acid addition salt thereof.

3. The hydrochloride of a compound as in claim 2, wherein $R_1$ is hydroxy, $R_2$ is ethyl, $R_3$ is hydrogen, and $n$ is 2.

4. The hydrochloride of a compound as in claim 2, wherein $R_1$ is hydroxy, $R_2$ is ethyl, $R_3$ is hydrogen, and $n$ is 1.

5. The hydrochloride of a compound as in claim 2, wherein $R_1$ is hydroxy, $R_2$ is methoxy, $R_3$ is hydrogen, and $n$ is 1.

6. The hydrochloride of a compound as in claim 2, wherein $R_1$ is hydroxy, $R_2$ is methoxy, $R_3$ is hydrogen, and $n$ is 2.

7. The methanesulfonate of a compound as in claim 2, wherein $R_1$ is hydroxy, $R_2$ is methoxy, $R_3$ is hydrogen, and $n$ is 2.

8. The hydrochloride of a compound as in claim 2, wherein $R_1$ is hydroxy, $R_2$ is n-propoxy, $R_3$ is hydrogen, and $n$ is 2.

9. The hydrochloride of a compound as in claim 2, wherein $R_1$ is hydroxy, $R_2$ is methoxy, $R_3$ is hydrogen, and $n$ is 3.

References Cited

FOREIGN PATENTS 2,797    9/1964    France.
826,803    1/1960    Great Britain.

OTHER REFERENCES

Chemical Abstracts, vol. 64, cols. 709 to 711, January 1966.

De Stevens et al.: Medicinal Chemistry, vol. 5 (Analgetics), pages 217 to 219, Academic Press Inc. New York, January 1965.

JOHN D. RANDOLPH, Primary Examiner

U.S. Cl. X.R.
260—293.4, 294.3, 294.7; 424—267

PO-1050
(5/69)

UNITED STATES PATENT OFFICE
CERTIFICATE OF CORRECTION

Patent No. 3,462,427     Dated August 19, 1969

Inventor(s) HERBERT MERZ ET AL

It is certified that error appears in the above-identified patent and that said Letters Patent are hereby corrected as shown below:

Column 3, line 44 and 45   "(X) 4-(4'-hydroxy-phenyl)-4-carbethoxy-piperidine hyperidine, M.P. 209°C" should read -- XI. α-3-methyl-4-(3'-hydroxy-phenyl)-4-propionyl-piperidine, M.P. 209°C --

Column 7, line 68   " $CH_2-CH-\langle H \rangle$ " should read -- $CH_2-CH=\langle H \rangle$ --

Column 13, line 42   " $\underset{N}{\diagup}C-R_2$ " should read -- $\underset{N}{\diagup}\overset{C-R_2}{\underset{R_3}{|}}$ --

SIGNED AND
SEALED
MAY 12 1970

(SEAL)
Attest:

Edward M. Fletcher, Jr,
Attesting Officer

WILLIAM E. SCHUYLER, JR.
Commissioner of Patents